United States Patent
Garthwaite et al.

(10) Patent No.: US 9,524,340 B1
(45) Date of Patent: *Dec. 20, 2016

(54) DIGITAL CONTENT CURATION AND DISTRIBUTION SYSTEM AND METHOD

(71) Applicant: IRIS.TV, INC., Los Angeles, CA (US)

(72) Inventors: Field J. Garthwaite, Los Angeles, CA (US); David Clausen, Seattle, WA (US); Pehr Hovey, Los Angeles, CA (US); Winston Owens, Los Angeles, CA (US)

(73) Assignee: IRIS.TV, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,495

(22) Filed: Jan. 21, 2014

Related U.S. Application Data (63) Continuation of application No. 13/452,505, filed on Apr. 20, 2012, now Pat. No. 8,635,220.

(60) Provisional application No. 61/478,354, filed on Apr. 22, 2011.

(51) Int. Cl.
*G06F 7/00* (2006.01)
*G06F 17/30* (2006.01)

(52) U.S. Cl.
CPC ..... *G06F 17/3082* (2013.01); *G06F 17/30817* (2013.01); *G06F 17/30828* (2013.01)

(58) Field of Classification Search
None
See application file for complete search history.

(56) References Cited

U.S. PATENT DOCUMENTS

| | | |
|---|---|---|
| 6,005,565 A | 12/1999 | Legall et al. |
| 6,020,883 A | 2/2000 | Herz et al. |
| 7,113,917 B2 | 9/2006 | Jacobi et al. |
| 7,526,458 B2 | 4/2009 | Flinn et al. |
| 7,574,422 B2 | 8/2009 | Guan et al. |
| 7,581,237 B1 | 8/2009 | Kurapati |
| 7,584,171 B2 | 9/2009 | Guan et al. |
| 7,590,616 B2 | 9/2009 | Guan et al. |
| 7,627,824 B2 | 12/2009 | Segel |
| 7,634,790 B2 | 12/2009 | Finseth et al. |
| 7,657,906 B2 | 2/2010 | Icho et al. |
| 7,716,220 B2 | 5/2010 | Michelitsch et al. |
| 7,774,341 B2 | 8/2010 | Aravamudan et al. |
| 7,853,622 B1 | 12/2010 | Baluja et al. |
| 8,117,545 B2 | 2/2012 | Rosenbaum et al. |
| 8,635,220 B2 | 1/2014 | Garthwaite et al. |
| 8,769,576 B2 * | 7/2014 | Burkitt .............. G06F 17/30817 725/40 |
| 8,781,231 B1 * | 7/2014 | Kumar et al. ................. 382/190 |
| 2003/0020744 A1 * | 1/2003 | Ellis et al. .................... 345/723 |
| 2003/0115191 A1 | 6/2003 | Copperman et al. |
| 2005/0114885 A1 | 5/2005 | Shikata et al. |

(Continued)

*Primary Examiner* — Uyen Le
(74) *Attorney, Agent, or Firm* — Wong & Rees LLP; Kirk D. Wong (57) ABSTRACT

Disclosed herein are systems and method for curating and distributing digital content; including: digital video, music, pictures, etc. For example, presented herein are systems and methods for providing a digital content program, including a plurality of continuously provided digital assets streamed over a digital content platform. Example embodiments include: (a) curating a plurality of assets; (b) selecting a subset of assets from the plurality of assets, based on similarity metrics between assets; and (c) ordering the subset of assets into a digital content program.

15 Claims, 6 Drawing Sheets

(56) References Cited

U.S. PATENT DOCUMENTS

| | | |
|---|---|---|
| 2007/0028279 A1 | 2/2007 | Kim |
| 2007/0061724 A1 | 3/2007 | Slothouber et al. |
| 2007/0106627 A1 | 5/2007 | Srivastava et al. |
| 2007/0162544 A1 | 7/2007 | Rosenbaum |
| 2007/0185893 A1 | 8/2007 | Rosenbaum |
| 2007/0266021 A1 | 11/2007 | Aravamudan et al. |
| 2008/0086688 A1 | 4/2008 | Chandratillake et al. |
| 2008/0301737 A1 | 12/2008 | Hjelmeland Almas et al. |
| 2009/0044227 A1 | 2/2009 | Nagatani et al. |
| 2009/0083796 A1 | 3/2009 | Karasudani et al. |
| 2009/0089830 A1 | 4/2009 | Chandratillake et al. |
| 2009/0119169 A1 | 5/2009 | Chandratillake et al. |
| 2009/0235298 A1 | 9/2009 | Carlberg et al. |
| 2010/0186041 A1 | 7/2010 | Chu et al. |
| 2010/0293048 A1 | 11/2010 | Singolda et al. |
| 2011/0282745 A1 | 11/2011 | Meoded et al. |
| 2011/0321072 A1 | 12/2011 | Patterson et al. |
| 2012/0271825 A1 | 10/2012 | Garthwaite et al. |
| 2012/0296900 A1* | 11/2012 | Kalai et al. .................. 707/737 |

\* cited by examiner

DIGITAL CONTENT CURATION AND DISTRIBUTION SYSTEM AND METHOD

CROSS-REFERENCE TO RELATED APPLICATIONS; PRIORITY CLAIM

This application claims benefit as a Continuation of application Ser. No. 13/452,505, filed Apr. 20, 2012, now U.S. Pat. No. 8,635,220, which claims benefit of Provisional Application No. 61/478,354, filed Apr. 22, 2011, the entire contents of the foregoing are incorporated by reference as if fully set forth herein under 35 U.S.C. §120. The applicant hereby rescinds any disclaimer of claim scope in the parent application(s) or the prosecution history thereof and advises the USPTO that the claims in this application may be broader than any claim in the parent application(s).

BACKGROUND

Figure 1:
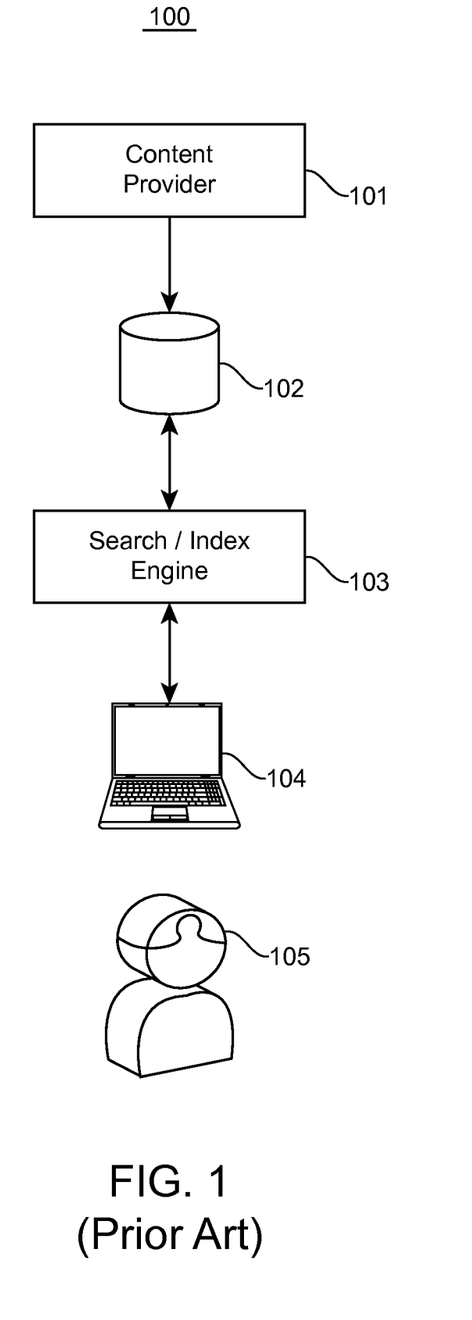
FIG. 1 is a high-level diagram illustrating a typical digital content distribution system.

The present invention is related to digital content distribution systems. FIG. 1 is a high-level diagram illustrating a typical digital content distribution system 100. In practice, a content provider 101 stores a plurality of digital content assets in an asset library 102. As used herein, the term "asset" broadly includes any machine-readable and/or machine-storable files containing digital content, or a pointer, placeholder, unique reference locator (URL), or equivalent means for redirecting an end-user 105 to the digital content. Digital content may include any digital video, music, pictures, or equivalents thereof. The end-user 105 employs an end-user device 104 to access the assets via a distribution platform; such as a website, mobile application, TV widget, or equivalents thereof. The end-user 105 may use a search/index engine 103 to query the asset library 102 for an asset of interest. Search queries are typically conducted based on tags, keywords, and/or associated metadata linked to individual assets. Recommendation engines are also known, which may recommend assets to the end-user 105, based on the tags, keywords, and/or associated metadata.

However, content providers lack a mechanism for curating and programming their asset libraries in order to distribute content in meaningful and engaging ways.

SUMMARY

Disclosed herein are systems and method for curating and distributing digital content; including: digital video, music, pictures, etc. For example, presented herein are systems and methods for providing a digital content program (or playlist), including a plurality of continuously provided digital assets streamed over a digital content platform. Example embodiments include: (a) curating a plurality of assets; (b) selecting a subset of assets from the plurality of assets, based on similarity metrics between assets; and (c) ordering the subset of assets into a digital content program.

BRIEF DESCRIPTION OF THE FIGURES

The accompanying drawings, which are incorporated herein, form part of the specification. Together with this written description, the drawings further serve to explain the principles of, and to enable a person skilled in the relevant art(s), to make and use the claimed systems and methods.

DETAILED DESCRIPTION

The present invention generally relates to systems and methods for curating and distributing digital content, such as: digital video, music, pictures, and equivalents thereof. For example, presented herein are systems and methods for providing a digital content program (or playlist), including a plurality of continuously provided digital assets streamed over a digital content platform. Example embodiments include: (a) curating a plurality of assets; (b) selecting a subset of assets from the plurality of assets, based on similarity metrics between assets; and (c) ordering the subset of assets into a digital content program.

In one embodiment, there is provided a system wherein assets are identified and collected by one or more content providers, end-users, and/or service providers. The identified and collected assets are then stored in a database, where additional information is collected and attributed to each individual asset. For example, such additional information may include asset data such as: tags, metadata, end-user behavior and considerations, taxonomy descriptors, keywords, labels, ratings, production data, production costs, distribution restrictions/rights, promotional data, distribution data, monetization data, syndication data, closed captioning data, aggregate user interactions, age of the asset, ratings by curators or third-party sources, asset viewing history, asset viewer count, asset flagging, asset share history, length, context/content within the asset, and any combinations or equivalents thereof. Such asset data may be provided by: 1) curation programs established by a service provider; 2) importation from the asset provider; and/or 3) aggregate user behavior and/or interaction with the asset. The database of assets may then be accessed by an end-user via a programmable user-interface. However, prior to distribution to the end-user, the assets can be further curated to establish a presentation order. For example, in one embodiment, one or more assets can be processed through a similarity metrics engine, wherein one or more assets are tested against each other to identify similarities between the assets. As such, a "sub-group" or "subset" of assets may be identified, selected, and/or organized for distribution. Further, multiple layers of curation and filtering may be applied to rank, order, re-rank, and/or re-order the assets prior to distribution.

Figure 2:
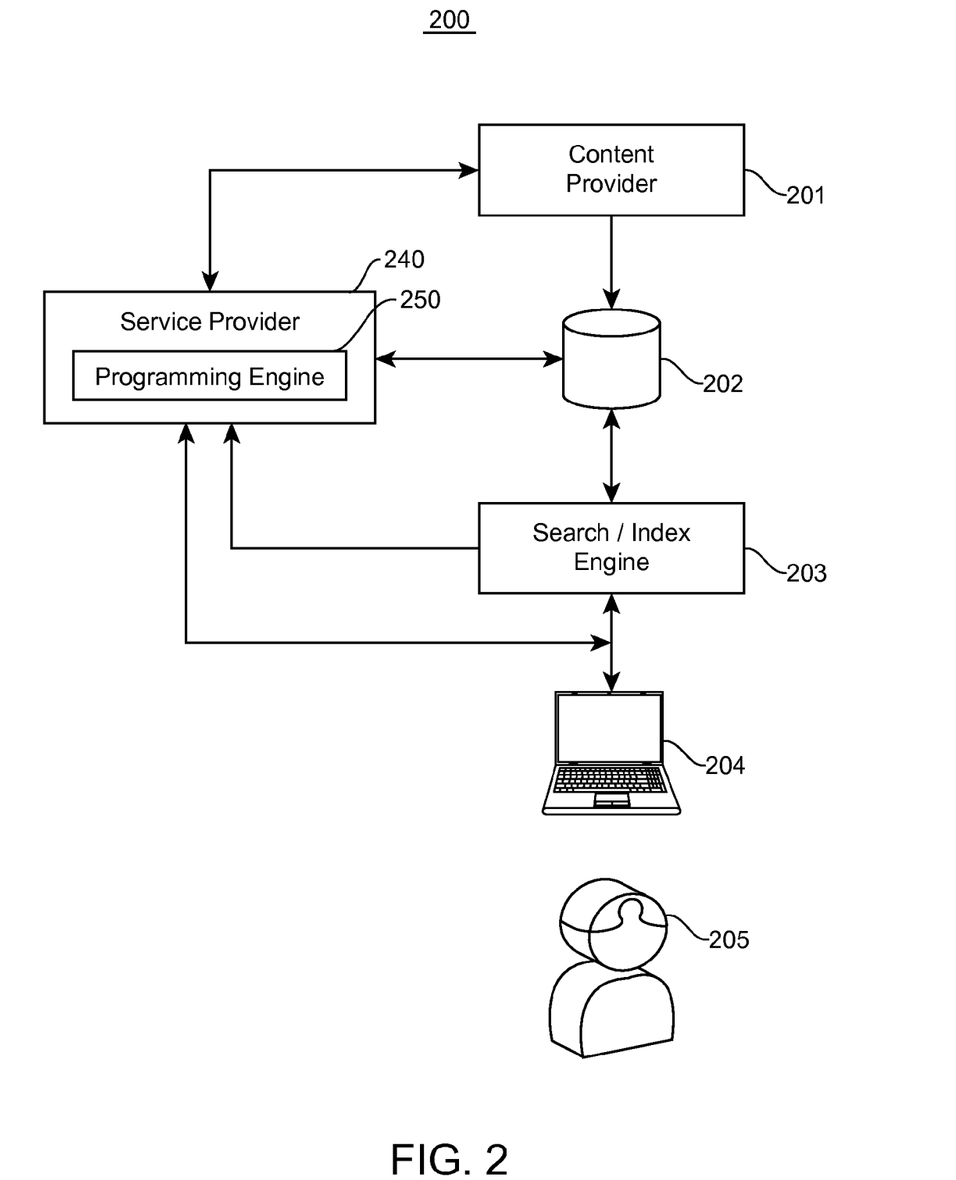
FIG. 2 is a high-level diagram illustrating a digital content distribution system in accordance with one embodiment of the present invention.

FIG. 2 is a high-level diagram illustrating a digital content distribution system 200, in accordance with one embodiment of the present invention. Similar to the system 100 described above with respect to FIG. 1, system 200 includes a content provider 201, whom stores a plurality of digital content assets in an asset library 202. An end-user 205 employs an end-user device 204 to access the assets via a distribution platform; such as a website, mobile application, TV widget, or equivalents thereof. The end-user 205 may use a search/index engine 203 to query the asset library 202 for an asset of interest. Search queries are typically conducted based on tags, keywords, and/or associated metadata linked to individual assets.

System 200 of FIG. 2, however, differs from system 100 of FIG. 1 in that a service provider 240, which may be an independent system component or a system component within and/or controlled by content provider 201, performs the function of curating and organizing assets within asset library 202. The service provider 240 ultimately prepares an asset program to be provided (directly or indirectly) to the distribution platform on the end-user device 204. More specifically, in one embodiment, the service provider 240 includes a programming engine 250 that curates, organizes, scores, ranks, orders, and/or re-orders assets into an asset program based on similarity metrics between assets and/or end-user behavior.

For example, in one embodiment, the service provider 240 can curate the assets within asset library 202 to create a directed weighted content graph based on a content taxonomy. The content graph is used to identify a hierarchy of similarities between assets. As such, relationships between assets can be established, which go beyond dependence on only tags, keywords, and/or metadata. For example, assets can be analyzed to identify asset data such as: tags, metadata, end-user behavior and considerations, taxonomy descriptors, keywords, labels, ratings, aggregate user interactions, age of the asset, ratings by curators or third-party sources, asset viewing history, asset viewer count, asset flagging, asset share history, length, context/content within the asset, and any combinations or equivalents thereof. Such asset data may be collected from sources such as: 1) curation programs established by a service provider; 2) importation from the asset provider; and/or 3) aggregate user behavior and/or interaction with the asset.

The service provider 240 may also have a direct (or indirect) link to the end-user 205, in order to obtain and/or analyze the end-user's behavioral information and/or profile. For example, the service provider 240 may obtain end-user behavior or intent information in the form of: system data, link access data, share data, search query, end-user ratings of one or more assets, viewing history, end-user interaction with an initially-viewed asset, end-user interaction (e.g., likes/dislikes, saves, volume played, adding to playlist, percentage of video watched, sharing with friends, additional requests for similar content, etc.) with one or more assets in the content graph, and any combination or equivalents thereof.

Figure 3:
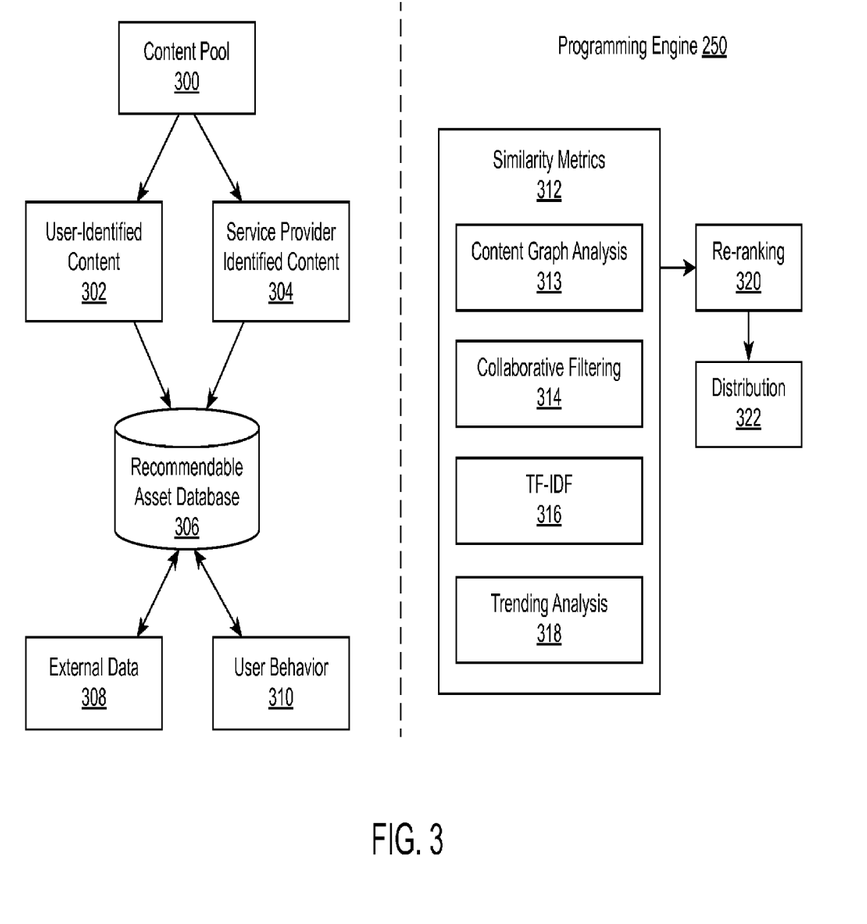
FIG. 3 is a high-level diagram illustrating a service provider programming engine, and respective inputs, in accordance with an embodiment of the present invention.

FIG. 3 is a high-level diagram illustrating an example service provider programming engine 250, and respective inputs, in accordance with an embodiment of the present invention. More specifically, FIG. 3 illustrates the curation and organization process, for the preparation of an asset program. As shown, one or more assets can be pulled from a content pool 300, which may include assets available in a content provider asset library, or otherwise available on one or more networks, such as the Internet. Content pool 300 may include licensed or unlicensed assets. From content pool 300, user identified content 302 and/or service provider identified content 304 is submitted to a recommendable asset database 306, where the assets may be stored. In one embodiment, storing assets in database 306 may include saving actual digital content files on a server. In another embodiment, however, storing assets in database 306 may more generally refer to storing and/or maintaining a database of pointers, placeholders, URLs, or equivalent means for redirecting an end-user to and/or accessing digital content on a remote system.

Within database 306, the assets are organized and categorized. For example, one or more taxonomy structures may be applied to the assets. Further, external data 308 and/or user behavior 310 may be applied to, and associated with, each individual asset in the database 306. Within database 306, tags, labels, keywords, and/or ratings may also be applied to each individual asset. Tags and keywords may be applied to aid in future search queries or classifications against database 306. Labels may be applied in a tiered structure to further organize the assets. For example, a first tier label may be used to designate high-level classification in subject matter and genre. A second tier label may be used to assign secondary and additional descriptive information to an asset. Ultimately, within database 306, the assets are organized and prepared for delivery to an end-user via distribution module 322.

In the embodiment shown, the assets may be further curated prior to presentation to an end-user. For example, the assets may be organized and ordered to meet an end-user's entertainment needs. The organization and order of the asset distribution may be provided by processing the assets through one or more curation engines. For example, in one embodiment, assets are processed through a similarity metrics engine 312 and/or re-ranking engine 320 prior to distribution 322.

In similarity metrics engine 312, various processing modules and functions may be applied to a group of assets. For example, a group of assets may be ordered by inputs from a content graph 313, a collaborative filtering module 314, a term frequency-inverse document frequency (TF-IDF) module 316, a trending analysis module 318, and/or any combination thereof. Each processing module or function may be applied to the group of assets to rank and/or order the assets prior to distribution. For example, content graph 313 may assign a similarity metric based on the position of the asset on the one or more taxonomy structures applied to the asset(s) in database 306. In one embodiment, content graph 313 is a directed weighted graph, wherein asset similarity is measured based on distance within the graph. In one embodiment, assets can be selected for further analysis and/or ordering based on the minimum graph distance between two or more assets. Collaborative filtering 314 may assign a similarity metric based on input from one or more end-users. TF-IDF 316 may assign a similarity metric based on the content, context, tags, keywords, or other factors associated with the asset(s) on the distribution platform. Trending analysis 318 may assign a similarity metric based on user feedback, user behavior 310, or other metrics, such as asset viewing history. As such, similarity metrics engine 312 is used to draw a group of content/context-relevant assets from database 306.

After the assets have been selected, ranked, and/or ordered in similarity metrics engine 312, the ranked and/or ordered assets may be submitted to a re-ranking engine 320. In one embodiment, the re-ranking engine 320 may include inputs from human-curation and/or machine-learned curation. The re-ranking engine 320 may also perform quality checks and re-rank and/or re-order the assets depending, at least in part, on the quality of the asset. In one embodiment, the re-ranking engine 320 modifies the subset of assets selected by similarity metric engine 312, based on asset data, user profile information, and/or additional constraints (e.g., system data, computational capabilities, bit rate delivery, etc.). In another embodiment, the re-ranking engine 320 conducts a diversity test amongst the subset of selected assets. The diversity test (or score) may then be used to organize the subset of assets in a more user-engaging manner. As such, the asset program may factor in "dissimilarity" amongst otherwise similar assets.

In the embodiment shown, assets from the original content pool 300 are being processed through multiple filters to thereby deliver a program (or playlist) of the highest quality and most relevant assets to an end-user, via distribution module 322. The multiple filters include, for example user and/or service provider identification; user behavior; similarity metrics; and/or re-ranking filters. Distribution module 322 may include distribution channels (e.g. a group-specific channel), creative programming channels, asset libraries, content sharing platform(s), and equivalents thereof.

In one embodiment, distribution module 322 receives input or feedback from an end-user. The input/feedback may be submitted to the curation and distribution system via user behavior input 310, collaborative filtering 314, and/or trending analysis 318.

Figure 4:
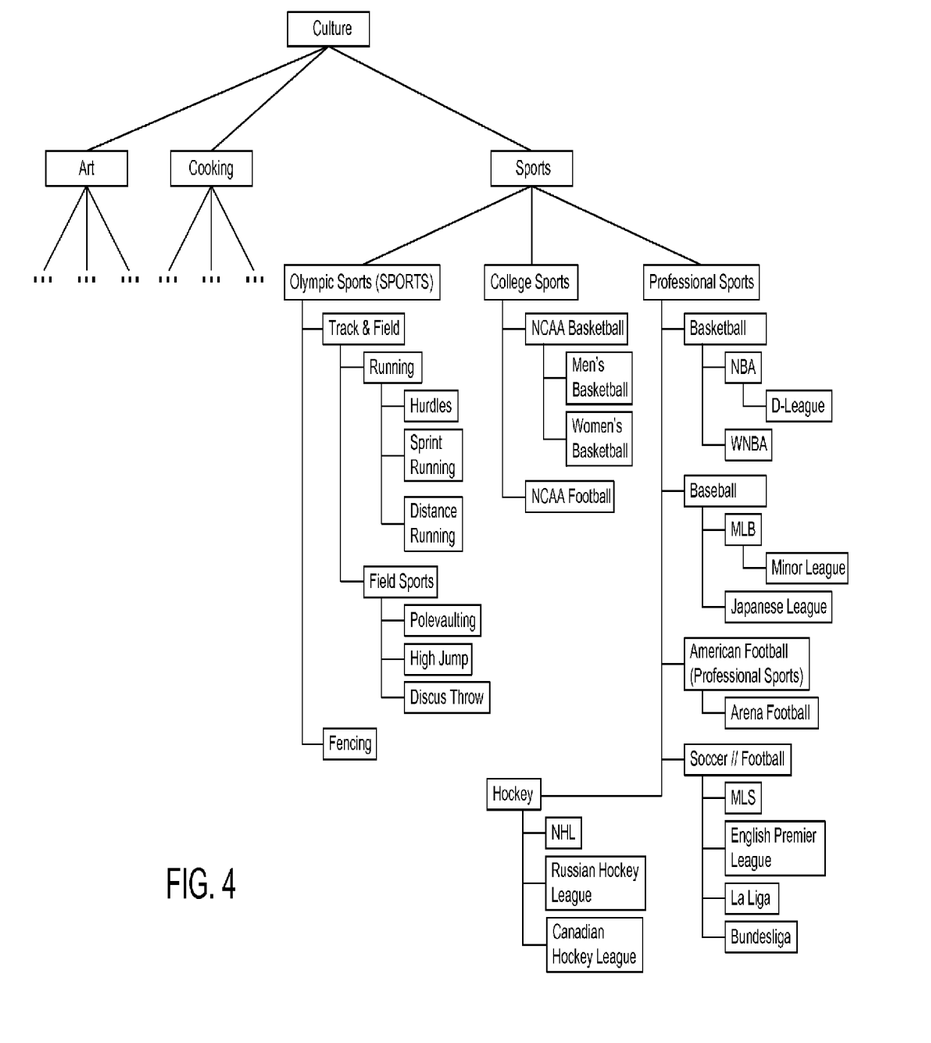
FIG. 4 is an example of a directed weighted content graph in accordance with an embodiment of the present invention.

FIG. 4 is an example of a directed weighted content graph, illustrating an example content taxonomy, in accordance with an embodiment of the present invention. The directed weighted content graph uses a hierarchy of tags as "nodes," to which distances may be applied. Assets can be curated within the shown structure, such that similarities between assets can be defined and used in an automated fashion. The directed weighted content graph is used as a tool for identify and selecting assets based on an established relationship between assets. The directed weighted content graph also provides an objective tool to algorithmically identify and select similar assets in an automated and scalable matter. By linking the assets through a directed weighted content graph, the service provider's computer system can identify and select "similar" assets, which may have a high likelihood of engaging and entertaining the end-user, but may not necessarily include the same metadata (or meta-tags) associated with a previously-viewed asset. A more detailed explanation of directed weighted graphs (also known as simply "weighted digraphs") can be found in Rade et al., "Mathematics handbook for science and engineering," Springer Science & Business, 2004, which is incorporated herein by reference, particularly with reference to page 36.

Figure 5:
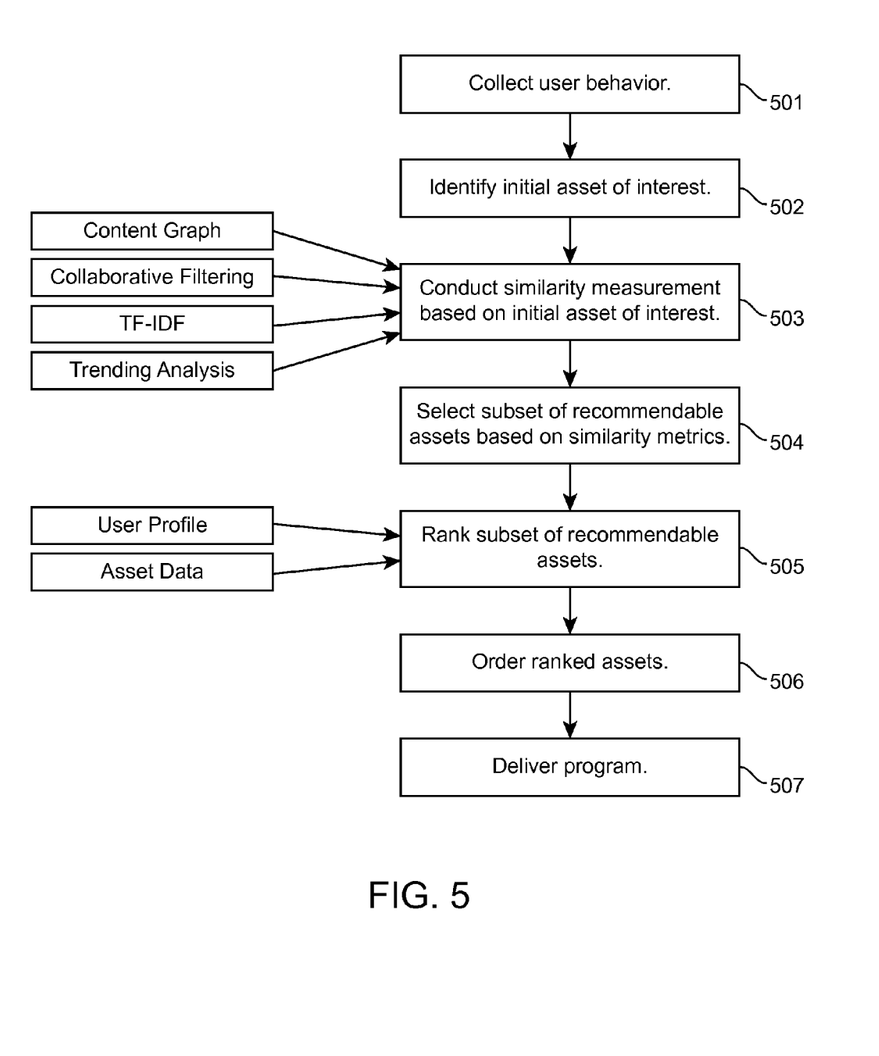
FIG. 5 is a flowchart outlining one embodiment of the present invention.

FIG. 5 is a flowchart describing one embodiment of the present invention. More specifically, FIG. 5 shows a method 500 for preparing an asset program (or playlist), in accordance with one embodiment presented. In step 501, user behavior is collected. User behavior may include a request for content from an end-user device. In step 502, an initial asset of interest is identified. The initial asset of interest may be an asset that has been clicked on or otherwise viewed by the user. In step 503, a similarity measure is conducted based on the initial asset of interest. For example, inputs from one or more of a content graph, collaborative filtering, TF-IDF, and/or trending analysis can be used to compare the initial asset of interest with one or more assets in an asset pool (or library). In step 504, a subset of recommendable assets are selected based on similarity metrics between assets. In step 505, the subset of assets are ranked based on the user's profile and/or individual or aggregate asset data. In step 506, the ranked assets are ordered into an asset program (or playlist). In one embodiment, the diversity amongst the ranked assets is used as a factor for ordering the asset program. In step 507, the asset program is delivered to the end-user.

Additional Embodiments

In one embodiment, there is provided a method of providing a digital video content program, including a plurality of continuously played video assets streamed over a digital content platform, the method comprising: (a) curating a plurality of video assets into a directed weighted content graph based on a content taxonomy; (b) providing an application programming interface (API) configured to receive a programming request and an initially-viewed video asset, wherein the initially-viewed video asset is amongst the plurality of video assets curated into the content graph; a service provider computer system then (c) selecting a subset of video assets from the plurality of video assets, based on a similarity measurement between the initially-viewed video asset and one or more of the plurality of video assets, wherein the subset of video assets include two or more video assets; (d) ordering the subset of video assets into a digital video content program; and (e) sending the digital video content program to an end-user device via the API. The similarity measurement may include a calculation of minimum graph distance between the initially-viewed video asset and one or more video assets in the content graph. The similarity measurement may include data obtained from the group consisting of: a term frequency-inverse document frequency (TF-IDF) analysis, a collaborative filtering analysis, and a trending analysis. The API may be further configured to receive end-user data. The end-user data may be selected from the group consisting of: a user search query, a user rating of the initial asset, system data, viewing history, user interaction with initial asset, user interaction with one or more assets in the content graph, and any combination thereof. The ordering step may be based in part on the end-user data. The method may further comprise: the service provider computer system (f) re-ordering the digital video content program based on asset data, user profile information, and/or additional constraints (e.g., system data, computational capabilities, bit rate delivery, etc.); and (g) sending the re-ordered digital video content program to the end-user device via the API. The API may be further configured to receive aggregate user data for one or more assets in the content graph. The ordering step may be based in part on the aggregate user data. The method may further comprise: the service provider computer system (h) calculating diversity between video assets in the subset of video assets; and/or (g) ordering or re-ordering the digital video content program based on diversity between video assets.

In another embodiment, there is provided a method of providing digital video content, the method comprising: (a) storing a content graph, wherein a pool of video assets are cataloged within the content graph based on a content taxonomy; (b) receiving a request for content from an end-user device; (c) obtaining end-user behavioral information on a previously viewed video asset, wherein the previously viewed video asset is amongst the cataloged video assets in the content graph; (d) identifying and/or selecting a subsequent video asset from the pool, to be provided to the end-user's device for viewing, based in part on (1) the end-user behavioral information, and (2) a calculation of a graph distance, on the content graph, between the previously viewed video asset and one or more video assets in the pool; and (e) delivering the subsequent video asset to the end-user's device. The method may further comprise (f) obtaining end-user system data. The identification of the subsequent video asset may be further based in part on a ranking of one or more video assets in the pool. The ranking may be based in part on factors selected from the group consisting of: similarity metrics; end-user behavioral information; collaborative filtering; TF-IDF; and trending analysis. The ranking factors may be individually weighted. The identification of the subsequent video asset may be further based in part on a re-ranking of a subset of the ranked video assets in the pool. The re-ranking of the subset is based on weighted asset-specific attributes of the subset of video assets. The re-ranking of the subset may be based on diversity amongst assets in the subset.

In another embodiment, there is provided a system for providing a digital video content program, including a plurality of continuously played video assets streamed over a digital content platform, comprising: (a) means for receiving a programming request and an initially-viewed video asset, wherein the initially-viewed video asset is amongst a plurality of video assets curated into a directed weighted content graph; (b) means for calculating a similarity measurement between the initially-viewed video asset and one or more of the plurality of video assets; (c) means for selecting a subset of video assets from the plurality of video assets, based on the similarity measurement, wherein the subset of video assets include two or more video assets; (d) means for ordering the subset of video assets into a digital video content program; and (e) means for sending the digital video content program to an end-user device. The system may further comprise (f) means for re-ordering the digital video content program based on end-user data; (g) means for sending the re-ordered digital video content program to the end-user device; (h) means for identifying diversity amongst video assets in the subset of video assets; and/or (i) means for ordering the subset of video assets based on diversity. The similarity measurement may include a calculation of minimum graph distance between the initially-viewed video asset and one or more video assets in the content graph. The similarity measurement may include data obtained from the group consisting of: a term frequency-inverse document frequency (TF-IDF) analysis, a collaborative filtering analysis, and a trending analysis. The subset of video assets may be ordered based on end-user data, and the end-user data is selected from the group consisting of: a user search query, a user rating of the initial asset, system data, viewing history, user interaction with initial asset, user interaction with one or more assets in the content graph, and any combination thereof. The subset of video assets may additionally be ordered based aggregate user data for one or more assets in the content graph.

In another embodiment, there is provided systems and methods for providing digital content asset programs, in the form of a dynamically created sequence of assets, comprising: (a) receiving a programming request (with or without an initial asset), wherein a first asset (e.g., the initial asset) is selected/identified amongst a plurality of curated assets (e.g., curated into a directed weighted content graph); (b) calculating a similarity measurement between the first asset and one or more of the plurality of curated assets based on asset data (e.g., asset data collected from the curation process, asset creator, and/or aggregate user interaction with the asset); (c) selecting a subset of assets from the plurality of curated assets, based on the similarity measurement; (d) ordering the subset of assets into an asset program (or playlist); and (e) sending the digital asset program to an end-user device. The systems and methods may further comprise (f) re-ordering the asset program (before or after distribution) based on asset data, end-user data, and/or computational capabilities; and (g) sending the re-ordered asset program to the end-user device. The systems and methods may further comprise: (h) identifying diversity amongst assets in the subset of assets; and/or (i) ordering the subset of assets based on diversity. The systems and methods may further comprise: (j) obtaining end-user interaction data after delivery of the asset program; and (k) reiterating on or more of steps (a)-(j), in real-time, to continuously and dynamically deliver asset programs (or sequences of assets) to the end-user.

Communication Between Parties Practicing the Present Invention.

In one embodiment, communication between the various parties and components of the present invention is accomplished over a network consisting of electronic devices connected either physically or wirelessly, wherein digital information is transmitted from one device to another. Such devices (e.g., end-user devices and/or servers) may include, but are not limited to: a desktop computer, a laptop computer, a handheld device or PDA, a cellular telephone, a set top box, an Internet appliance, an Internet TV system, a mobile device or tablet, or systems equivalent thereto. Exemplary networks include a Local Area Network, a Wide Area Network, an organizational intranet, the Internet, or networks equivalent thereto. The functionality and system components of an exemplary computer and network are further explained in conjunction with FIG. 6, below.

Computer Implementation.

Figure 6:
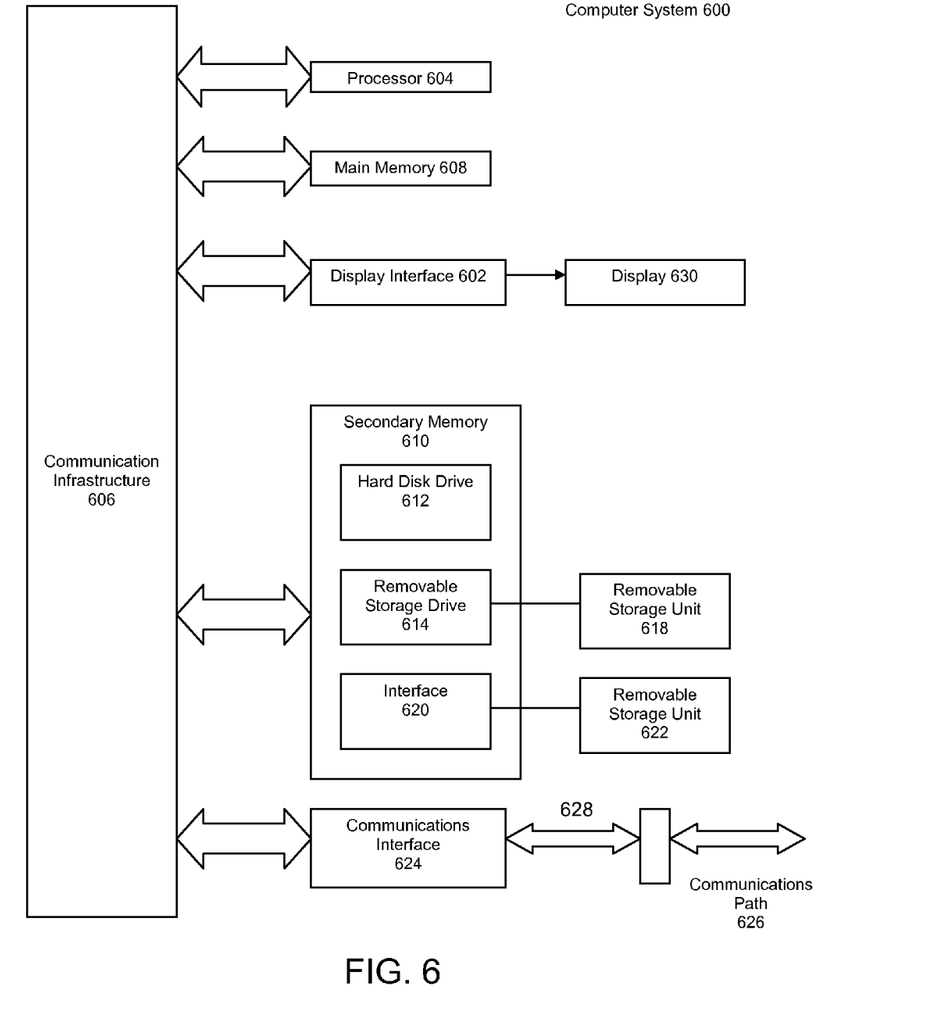
FIG. 6 is a schematic drawing of a computer system used to implement the methods presented.

In one embodiment, the invention is directed toward one or more computer systems capable of carrying out the functionality described herein. For example, FIG. 6 is a schematic drawing of a computer system 600 used to implement the methods presented above. Computer system 600 includes one or more processors, such as processor 604. The processor 604 is connected to a communication infrastructure 606 (e.g., a communications bus, cross-over bar, or network). Computer system 600 can include a display interface 602 that forwards graphics, text, and other data from the communication infrastructure 606 (or from a frame buffer not shown) for display on a local or remote display unit 630.

Computer system 600 also includes a main memory 608, such as random access memory (RAM), and may also include a secondary memory 610. The secondary memory 610 may include, for example, a hard disk drive 612 and/or a removable storage drive 614, representing a floppy disk drive, a magnetic tape drive, an optical disk drive, flash memory device, etc. The removable storage drive 614 reads from and/or writes to a removable storage unit 618. Removable storage unit 618 represents a floppy disk, magnetic tape, optical disk, flash memory device, etc., which is read by and written to by removable storage drive 614. As will be appreciated, the removable storage unit 618 includes a computer usable storage medium having stored therein computer software, instructions, and/or data.

In alternative embodiments, secondary memory 610 may include other similar devices for allowing computer programs or other instructions to be loaded into computer system 600. Such devices may include, for example, a removable storage unit 622 and an interface 620. Examples of such may include a program cartridge and cartridge interface (such as that found in video game devices), a removable memory chip (such as an erasable programmable read only memory (EPROM), or programmable read only memory (PROM)) and associated socket, and other removable storage units 622 and interfaces 620, which allow computer software, instructions, and/or data to be transferred from the removable storage unit 622 to computer system 600.

Computer system 600 may also include a communications interface 624. Communications interface 624 allows computer software, instructions, and/or data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical or other signals capable of being received by communications interface 624. These signals 628 are provided to communications interface 624 via a communications path (e.g., channel) 626. This channel 626 carries signals 628 and may be implemented using wire or cable, fiber optics, a telephone line, a cellular link, a radio frequency (RF) link, a wireless communication link, and other communications channels.

In this document, the terms "computer-readable storage medium," "computer program medium," and "computer usable medium" are used to generally refer to media such as removable storage drive 614, removable storage units 618, 622, data transmitted via communications interface 624, and/or a hard disk installed in hard disk drive 612. These computer program products provide computer software, instructions, and/or data to computer system 600. These computer program products also serve to transform a general purpose computer into a special purpose computer programmed to perform particular functions, pursuant to instructions from the computer program products/software. Embodiments of the present invention are directed to such computer program products.

Computer programs (also referred to as computer control logic) are stored in main memory 608 and/or secondary memory 610. Computer programs may also be received via communications interface 624. Such computer programs, when executed, enable the computer system 600 to perform the features of the present invention, as discussed herein. In particular, the computer programs, when executed, enable the processor 604 to perform the features of the presented methods. Accordingly, such computer programs represent controllers of the computer system 600. Where appropriate, the processor 604, associated components, and equivalent systems and sub-systems thus serve as "means for" performing selected operations and functions. Such "means for" performing selected operations and functions also serve to transform a general purpose computer into a special purpose computer programmed to perform said selected operations and functions.

In an embodiment where the invention is implemented using software, the software may be stored in a computer program product and loaded into computer system 600 using removable storage drive 614, interface 620, hard drive 612, communications interface 624, or equivalents thereof. The control logic (software), when executed by the processor 604, causes the processor 604 to perform the functions and methods described herein.

In another embodiment, the methods are implemented primarily in hardware using, for example, hardware components such as application specific integrated circuits (ASICs). Implementation of the hardware state machine so as to perform the functions and methods described herein will be apparent to persons skilled in the relevant art(s). In yet another embodiment, the methods are implemented using a combination of both hardware and software.

Embodiments of the invention, including any systems and methods described herein, may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing firmware, software, routines, instructions, etc.

For example, in one embodiment, there is provided a computer-readable storage medium, for providing a digital video content program, including a plurality of continuously played video assets streamed over a digital content platform, comprising: a directed weighted content graph having a plurality of video assets curated based on a content taxonomy; and instructions executable by at least one processing device that, when executed, cause the processing device to (a) receive a programming request and an initially-viewed video asset, wherein the initially-viewed video asset is amongst the plurality of video assets curated into the content graph, (b) calculate a similarity measurement between the initially-viewed video asset and one or more of the plurality of video assets, (c) select a subset of video assets from the plurality of video assets, based on the similarity measurement, wherein the subset of video assets include two or more video assets, (d) order the subset of video assets into a digital video content program, and (e) send the digital video content program to an end-user device. The similarity measurement may include a calculation of minimum graph distance between the initially-viewed video asset and one or more video assets in the content graph. The similarity measurement may include data obtained from the group consisting of: a term frequency-inverse document frequency (TF-IDF) analysis, a collaborative filtering analysis, and a trending analysis. The subset of video assets may be ordered based on end-user data. The end-user data may be selected from the group consisting of: a user search query, a user rating of the initial asset, system data, viewing history, user interaction with initial asset, user interaction with one or more assets in the content graph, and any combination thereof. The subset of video assets may alternatively be ordered based aggregate user data for one or more assets in the content graph. The computer-readable storage medium may further comprise instructions executable by at least one processing device that, when executed, cause the processing device to (f) re-order the digital video content program based on end-user data, and (g) send the re-ordered digital video content program to the end-user device.

CONCLUSION

The foregoing description of the invention has been presented for purposes of illustration and description. It is not intended to be exhaustive or to limit the invention to the precise form disclosed. Other modifications and variations may be possible in light of the above teachings. The embodiments were chosen and described in order to best explain the principles of the invention and its practical application, and to thereby enable others skilled in the art to best utilize the invention in various embodiments and various modifications as are suited to the particular use contemplated. It is intended that the appended claims be construed to include other alternative embodiments of the invention; including equivalent structures, components, methods, and means.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible. Further, each system component and/or method step presented should be considered a "means for" or "step for" performing the function described for said system component and/or method step. As such, any claim language directed to a "means for" or "step for" performing a recited function refers to the system component and/or method step in the specification that performs the recited function, as well as equivalents thereof.

It is to be appreciated that the Detailed Description section, and not the Summary and Abstract sections, is intended to be used to interpret the claims. The Summary and Abstract sections may set forth one or more, but not all exemplary embodiments of the present invention as contemplated by the inventor(s), and thus, are not intended to limit the present invention and the appended claims in any way.

What is claimed is:

1. A method, comprising:
    selecting, by a server, a subset of video assets from a plurality of video assets, based on a similarity measurement between an initially viewed video asset and one or more of the plurality of video assets using at least a trending analysis, the subset of video assets include two or more video assets;
    creating, by the server, a digital video content program containing the subset of video assets, the subset of video assets ordered within the digital video content program based on at least a diversity amongst the subset of video assets;
    sending, by the server, the digital video content program to a user device.

2. The method of claim 1, wherein the similarity measurement includes a calculation of minimum graph distance between the initially-viewed video asset and one or more video assets in a content graph.

3. The method of claim 1, wherein the ordering of the subset of video assets is further based in part on end-user data, the end-user data being any combination of: a user search query, a user rating of the initial asset, system data, viewing history, user interaction with initial asset, or user interaction with one or more assets in a content graph.

4. The method of claim 1, wherein the ordering of the subset of video assets is further based in part on aggregate user data.

5. The method of claim 1, wherein the digital video content program is sent as a stream of continuously played video assets.

6. A non-transitory computer-readable medium storing one or more sequences of instructions, which when executed by one or more processors, cause the one or more processors to carry out the steps of:
    selecting a subset of video assets from a plurality of video assets, based on a similarity measurement between an initially viewed video asset and one or more of the plurality of video assets using at least a trending analysis, the subset of video assets include two or more video assets;
    creating a digital video content program containing the subset of video assets, the subset of video assets ordered within the digital video content program based on at least a diversity amongst the subset of video assets;
    sending the digital video content program to a user device.

7. The computer-readable storage medium of claim 6, wherein the ordering of the subset of video assets step is further based in part on end-user data, the end-user data being any combination of: a user search query, a user rating of the initial asset, system data, viewing history, user interaction with initial asset, or user interaction with one or more assets in a content graph.

8. The computer-readable storage medium of claim 6, wherein the ordering of the subset of video assets is further based in part on aggregate user data.

9. The non-transitory computer-readable medium of claim 6, wherein the similarity measurement includes a calculation of minimum graph distance between the initially-viewed video asset and one or more video assets in a content graph.

10. The non-transitory computer-readable medium of claim 6, wherein the digital video content program is sent as a stream of continuously played video assets.

11. An apparatus, comprising:
    a subsystem, implemented at least partially in hardware, that selects a subset of video assets from a plurality of video assets, based on a similarity measurement between an initially viewed video asset and one or more of the plurality of video assets using at least a trending analysis, the subset of video assets include two or more video assets;
    a subsystem, implemented at least partially in hardware, that creates a digital video content program containing the subset of video assets, the subset of video assets ordered within the digital video content program based on at least a diversity amongst the subset of video assets;
    a subsystem, implemented at least partially in hardware, that sends the digital video content program to a user device.

12. The apparatus of claim 11, wherein the subsystem orders the subset of video assets further based in part on aggregate user data.

13. The apparatus of claim 11, wherein the similarity measurement includes a calculation of minimum graph distance between the initially-viewed video asset and one or more video assets in a content graph.

14. The apparatus of claim 11, wherein the ordering subsystem further orders the subset of video assets based in part on end-user data, the end-user data being any combination of: a user search query, a user rating of the initial asset, system data, viewing history, user interaction with initial asset, or user interaction with one or more assets in a content graph.

15. The apparatus of claim 11, wherein the digital video content program is sent as a stream of continuously played video assets.

* * * * *